US012431103B2

(12) United States Patent
Huang et al.

(10) Patent No.: US 12,431,103 B2
(45) Date of Patent: Sep. 30, 2025

(54) GATE DRIVER CIRCUIT

(71) Applicant: E Ink Holdings Inc., Hsinchu (TW)

(72) Inventors: Pei-Lin Huang, Hsinchu (TW); Chia-Hsien Wu, Hsinchu (TW); Jia-Hung Chen, Hsinchu (TW); An-Chi Liu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/673,297

(22) Filed: May 23, 2024

(65) Prior Publication Data

US 2025/0087174 A1 Mar. 13, 2025

(30) Foreign Application Priority Data

Sep. 7, 2023 (TW) ................................ 112134038

(51) Int. Cl.
*G09G 3/34* (2006.01)

(52) U.S. Cl.
CPC ... *G09G 3/3433* (2013.01); *G09G 2310/0267* (2013.01); *G09G 2310/08* (2013.01)

(58) Field of Classification Search
None
See application file for complete search history.

(56) References Cited

U.S. PATENT DOCUMENTS 8,542,178 B2 9/2013 Yoo et al.
10,629,133 B2 4/2020 Kim et al.
2017/0256224 A1* 9/2017 Xiao .................... G09G 3/3677
2017/0287423 A1* 10/2017 Yang .................... G09G 3/3688
2019/0378461 A1* 12/2019 Liu ...................... G09G 3/3266
2022/0358891 A1* 11/2022 Lv .......................... G11C 19/28
2023/0162684 A1 5/2023 Lu et al.

FOREIGN PATENT DOCUMENTS

| | | |
|---|---|---|
| TW | 201503093 | 1/2015 |
| TW | 202029175 | 8/2020 |
| TW | 202234081 | 9/2022 |
| TW | 202314336 | 4/2023 |
| TW | 202343401 | 11/2023 |

OTHER PUBLICATIONS

"Office Action of Taiwan Counterpart Application", issued on Aug. 7, 2024, pp. 1-5.

* cited by examiner

*Primary Examiner* — Kenneth Bukowski
(74) *Attorney, Agent, or Firm* — JCIPRNET

(57) ABSTRACT

A gate driver circuit including seven transistors and two capacitors is provided. A first end of a third transistor is coupled to a first pulse signal, a second end of the third transistor outputs a gate signal, and a control end of the third transistor is coupled to a first end of a second transistor. A first end of a fourth transistor is coupled to the second end of the third transistor, a second end of the fourth transistor is coupled to a first voltage, and a control end of the fourth transistor is coupled to a control end of the second transistor. A first end of a fifth transistor is coupled to a second voltage, a second end of the fifth transistor is coupled to the control end of the fourth transistor, and a control end of the fifth transistor is coupled to a second pulse signal.

11 Claims, 4 Drawing Sheets

GATE DRIVER CIRCUIT

CROSS-REFERENCE TO RELATED APPLICATION

This application claims the priority benefit of Taiwan application serial no. 112134038, filed on Sep. 7, 2023. The entirety of the above-mentioned patent application is hereby incorporated by reference herein and made a part of this specification.

BACKGROUND

Technical Field

This disclosure relates to a gate driver circuit, and in particular, to a gate driver circuit configured to drive an electronic paper display panel.

Description of Related Art

Due to the material characteristics of electronic paper, electronic paper display devices have been widely used in various fields because of their high stability, power saving, and long reading time. In terms of product characteristics, it is also necessary to meet the requirements of large size, aesthetics, high resolution, and narrow bezel. However, with the increase in resolution, the fan-out area between the gate driver chip and the electronic paper display panel increases, resulting in a thicker bezel of the electronic paper display device. In addition, the additional gate driver chip disposed outside the electronic paper display panel will also increase the cost of the electronic paper display device.

SUMMARY

The disclosure provides a gate driver circuit, capable of reducing an area of a circuit layout and achieving a narrow bezel design.

The gate driver circuit of the disclosure is configured to drive an electronic paper display panel. The gate driver circuit includes a first transistor, a second transistor, a third transistor, a fourth transistor, a fifth transistor, a sixth transistor, a seventh transistor, a first capacitor, and a second capacitor. The first transistor has a first end, a second end, and a control end. The first end and the control end of the first transistor are coupled to a first gate signal. The second transistor has a first end, a second end, and a control end. The first end of the second transistor is coupled to the second end of the first transistor, and the second end of the second transistor is coupled to a first voltage. The third transistor has a first end, a second end, and a control end. The first end of the third transistor is coupled to a first pulse signal, the second end of the third transistor is configured to output a second gate signal, and the control end of the third transistor is coupled to the first end of the second transistor. The fourth transistor has a first end, a second end, and a control end. The first end of the fourth transistor is coupled to the second end of the third transistor, the second end of the fourth transistor is coupled to the first voltage, and the control end of the fourth transistor is coupled to the control end of the second transistor. The fifth transistor has a first end, a second end, and a control end. The first end of the fifth transistor is coupled to a second voltage, the second end of the fifth transistor is coupled to the control end of the fourth transistor, and the control end of the fifth transistor is coupled to a second pulse signal. The sixth transistor has a first end, a second end, and a control end. The first end of the sixth transistor is coupled to the second end of the fifth transistor, and the control end of the sixth transistor is coupled to the control end of the third transistor. The seventh transistor has a first end, a second end, and a control end. The first end of the seventh transistor is coupled to the second voltage, the second end of the seventh transistor is coupled to the second end of the fifth transistor, and the control end of the seventh transistor is coupled to a third gate signal. The first capacitor has a first end and a second end. The first end of the first capacitor is coupled to the control end of the third transistor, and the second end of the first capacitor is coupled to the second end of the third transistor. The second capacitor has a first end and a second end. The first end of the second capacitor is coupled to the control end of the fourth transistor, and the second end of the second capacitor is coupled to the first voltage.

In an embodiment of the disclosure, the second end of the sixth transistor is coupled to the first voltage.

In an embodiment of the disclosure, the first voltage is less than the second voltage.

In an embodiment of the disclosure, the electronic paper display panel includes a $(N-1)^{th}$ gate line, a $N^{th}$ gate line, and a $(N+1)^{th}$ gate line. The first gate signal is configured to drive the $(N-1)^{th}$ gate line, the second gate signal is configured to drive the $N^{th}$ gate line, and the third gate signal is configured to drive the $(N+1)^{th}$ gate line. N is a natural number greater than 2.

In an embodiment of the disclosure, the gate driver circuit further includes an eighth transistor and a ninth transistor. The eighth transistor has a first end, a second end, and a control end. The first end of the eighth transistor is coupled to the first voltage, the second end of the eighth transistor is coupled to the control end of the third transistor, and the control end of the eighth transistor is coupled to the third gate signal. The ninth transistor has a first end, a second end, and a control end. The first end of the ninth transistor is coupled to the second end of the seventh transistor, the second end of the ninth transistor is coupled to the first voltage, and the control end of the ninth transistor is coupled to the first gate signal.

In an embodiment of the disclosure, the second end of the sixth transistor is coupled to a third voltage, and the third voltage is less than the first voltage.

In an embodiment of the disclosure, during a set period, the first transistor, the third transistor, and the sixth transistor are turned on, and the second transistor, the fourth transistor, the fifth transistor, and the seventh transistor are not turned on.

In an embodiment of the disclosure, during a boost period, the third transistor and the sixth transistor are turned on, and the first transistor, the second transistor, the fourth transistor, the fifth transistor, and the seventh transistor are not turned on.

In an embodiment of the disclosure, during a reset period, the second transistor, the fourth transistor, the fifth transistor, and the seventh transistor are turned on, and the first transistor, the third transistor, and the sixth transistor are not turned on.

In an embodiment of the disclosure, during a hold period, the second transistor and the fourth transistor are turned on, and the first transistor, the third transistor, the fifth transistor, the sixth transistor, and the seventh transistor are not turned on.

In an embodiment of the disclosure, during a stable period, the second transistor, the fourth transistor, and the fifth transistor are turned on, and the first transistor, the third transistor, the sixth transistor, and the seventh transistor are not turned on.

In an embodiment of the disclosure, the gate driver circuit is disposed on the electronic paper display panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
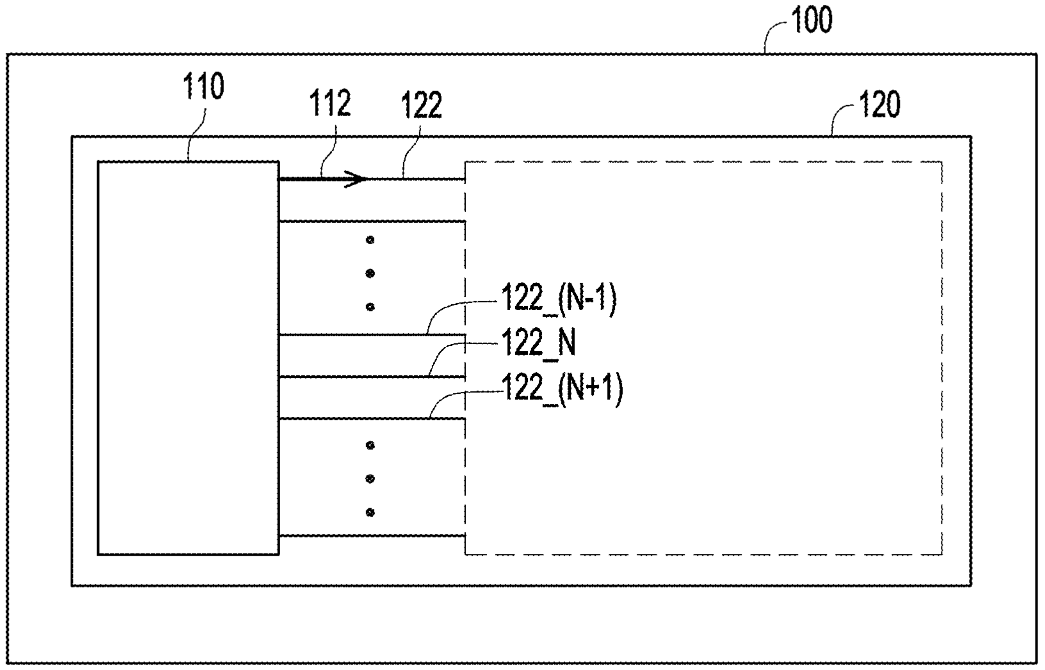
FIG. 1 is a block diagram of an electronic paper display device according to an embodiment of the disclosure.

FIG. 1 is a block diagram of an electronic paper display device according to an embodiment of the disclosure. Referring to FIG. 1, an electronic paper display device 100 includes a gate driver circuit 110 and an electronic paper display panel 120. The gate driver circuit 110 is disposed on the electronic paper display panel 120. The electronic paper display panel 120 includes multiple gate lines 112, for example, a $(N-1)^{th}$ gate line 122_(N−1), a $N^{th}$ gate line 122_N, and a $(N+1)^{th}$ gate line 122_(N+1), where N is a natural number greater than 2. The gate driver circuit 110 is coupled to the electronic paper display panel 120 through the gate line 122. The $(N-1)^{th}$ gate line 122_(N−1), the $N^{th}$ gate line 122_N, and the $(N+1)^{th}$ gate line 122_(N+1) are three adjacent gate lines.

The gate driver circuit 110 is configured to output a gate signal 112 to the gate line 122 and transmit the gate signal 112 to the electronic paper display panel 120 through the gate line 122 to drive the electronic paper display panel 120 to display an image. In addition, the electronic paper display device 100 further includes a driver circuit (not shown) that drives the electronic paper display panel 120 to display an image.

Figure 2:
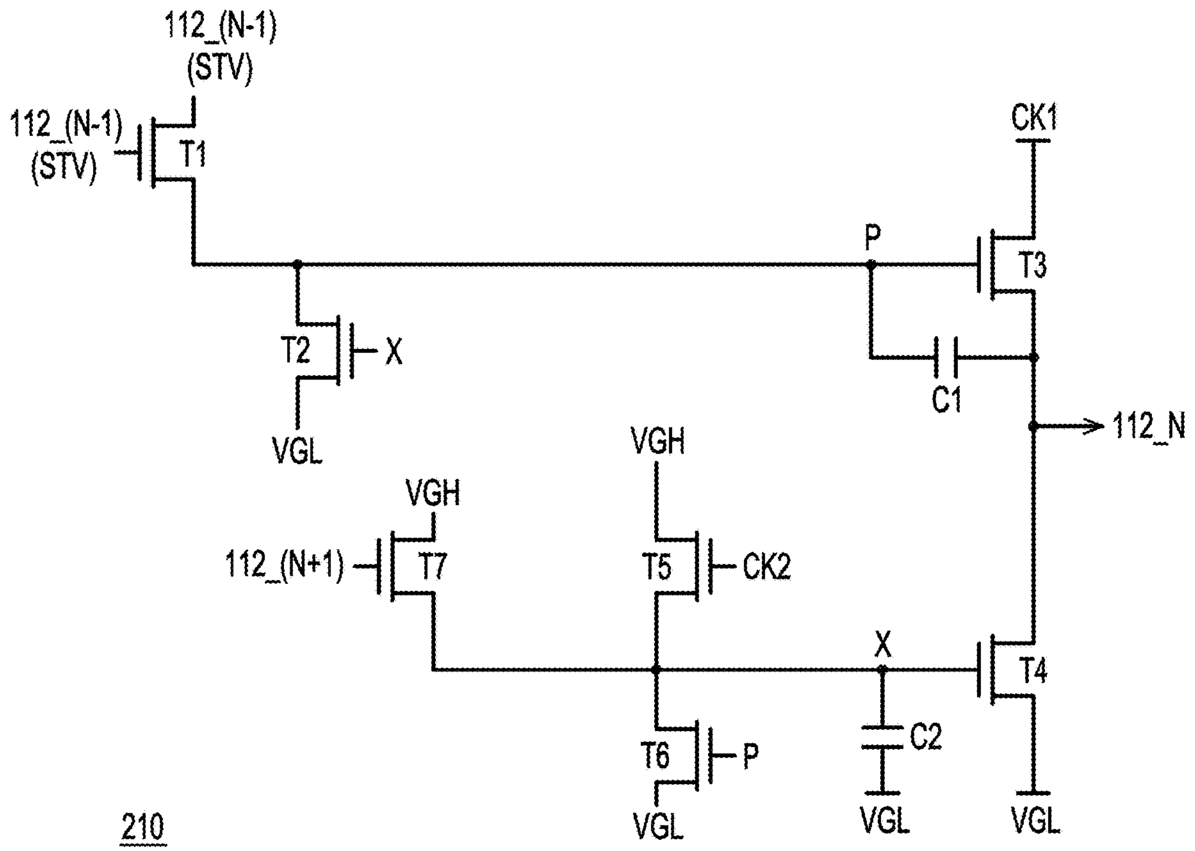
FIG. 2 is a schematic circuit structure diagram of a gate driver circuit according to an embodiment of the disclosure.

FIG. 2 is a schematic circuit structure diagram of a gate driver circuit according to an embodiment of the disclosure. Referring to FIG. 2, a gate driver circuit 210 includes a first transistor T1, a second transistor T2, a third transistor T3, a fourth transistor T4, a fifth transistor T5, a sixth transistor T6, a seventh transistor T7, a first capacitor C1, and a second capacitor C2.

Specifically, the first transistor T1 has a first end, a second end, and a control end. The first end and the control end of the first transistor T1 are coupled to a first gate signal 112_(N−1). The first gate signal 112_(N−1) is configured to drive the $(N-1)^{th}$ gate line 122_(N−1). In an embodiment, if the $(N-1)^{th}$ gate line is a first gate line, the first end and the control end of the first transistor T1 are coupled to a start signal STV. The second transistor T2 has a first end, a second end, and a control end. The first end of the second transistor T2 is coupled to the second end of the first transistor T1, and the second end of the second transistor T2 is coupled to a first voltage VGL.

The third transistor T3 has a first end, a second end, and a control end. The first end of the third transistor T3 is coupled to a first pulse signal CK1. The second end of third transistor T3 is configured to output a second gate signal 112_N. The second gate signal 112_N is configured to drive the $N^{th}$ gate line 122_N. A control end P of the third transistor T3 is coupled to the first end of the second transistor T2. The fourth transistor T4 has a first end, a second end, and a control end. The first end of the fourth transistor T4 is coupled to the second end of the third transistor T3. The second end of fourth transistor T4 is coupled to the first voltage VGL. A control end X of the fourth transistor T4 is coupled to a control end (labeled X) of the second transistor T2.

The fifth transistor T5 has a first end, a second end, and a control end. The first end of the fifth transistor T5 is coupled to a second voltage VGH. The first voltage VGL is less than the second voltage VGH. The second end of the fifth transistor T5 is coupled to the control end X of the fourth transistor T4. The control end of the fifth transistor T5 is coupled to a second pulse signal CK2. The sixth transistor T6 has a first end, a second end, and a control end. The first end of the sixth transistor T6 is coupled to the second end of the fifth transistor T5. The second end of the sixth transistor T6 is coupled to the first voltage VGL. The control end of the sixth transistor is coupled to the control end of the third transistor T3 (labeled P).

The seventh transistor T7 has a first end, a second end, and a control end. The first end of the seventh transistor T7 is coupled to the second voltage VGH. The second end of the seventh transistor T7 is coupled to the second end of fifth transistor T5. The control end of the seventh transistor T7 is coupled a third gate signal 112_(N+1). The third gate signal 112_(N+1) is configured to drive the $(N+1)^{th}$ gate line 122_(N+1).

The first capacitor C1 has a first end and a second end. The first end of the first capacitor C1 is coupled to the control end P of the third transistor T3. The second end of the first capacitor C1 is coupled to the second end of the third transistor T3. The second capacitor C2 has a first end and a second end. The first end of the second capacitor C2 is coupled to the control end X of the fourth transistor T4. The second end of the second capacitor C2 is coupled to the first voltage VGL.

Figure 3:
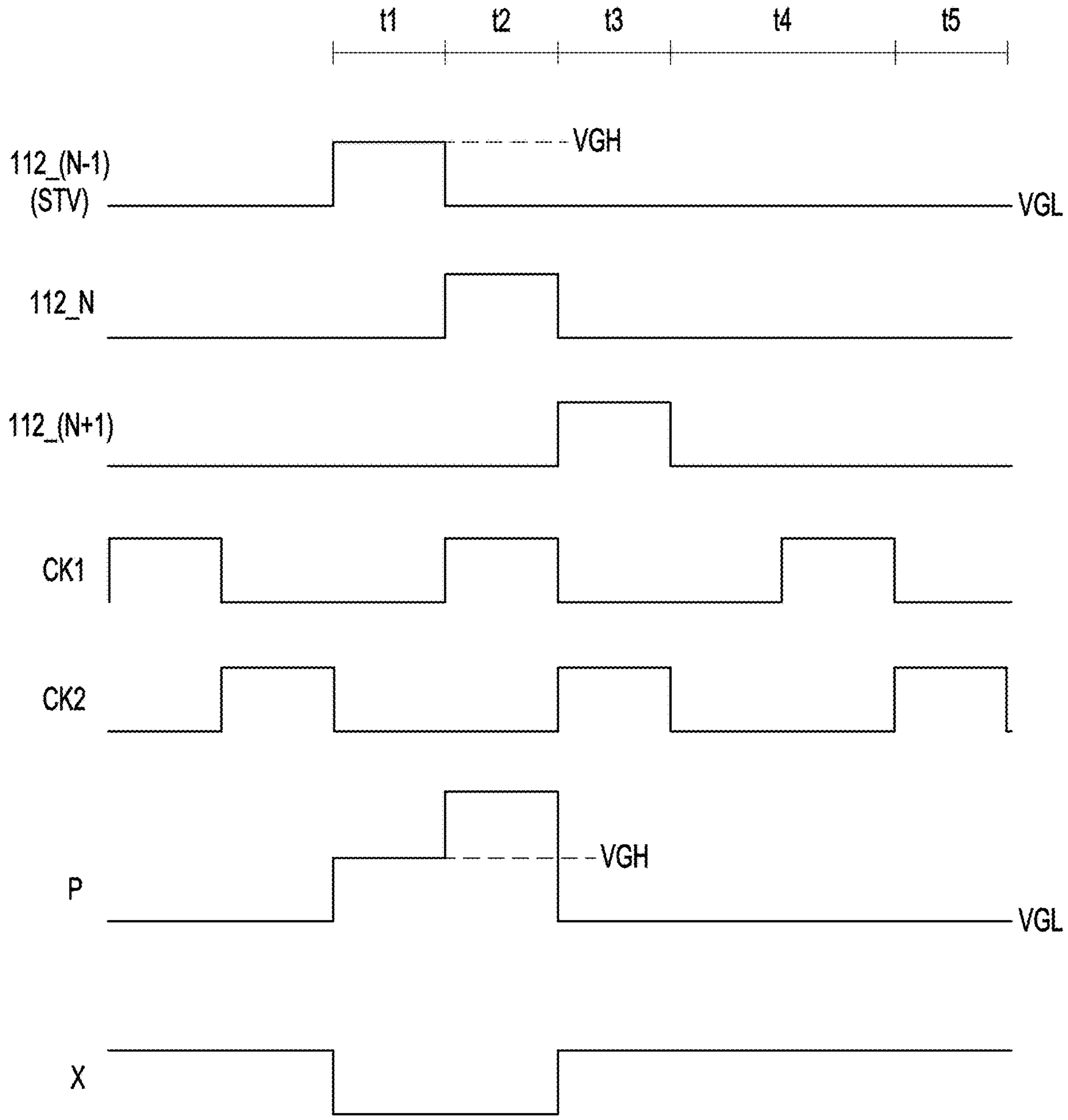
FIG. 3 is a schematic waveform diagram of each drive signal and node of the gate driver circuit according to the embodiment of FIG. 2.

The following describes an operation mode of the gate driver circuit 210 during each drive period. FIG. 3 is a schematic waveform diagram of each drive signal and nodes P and X of the gate driver circuit according to the embodiment of FIG. 2. The each drive signal includes the first gate signal 112_(N−1), the second gate signal 112_N, the third gate signal 112_(N+1), the first pulse signal CK1, and the second pulse signal CK2. Referring to FIGS. 2 and 3, a drive period in this embodiment may include a set period t1, a boost period t2, a reset period t3, a hold period t4, and a stable period t5.

During the set period t1, the first transistor T1, the third transistor T3, and the sixth transistor T6 are turned on, and the second transistor T2, the fourth transistor T4, the fifth transistor T5, and the seventh transistor T7 are not turned on. Specifically, during the set period t1, since the first gate signal 112_(N−1) is at a high level (such as VGH), the first transistor T1 is turned on, and a voltage at the node P is at the same high level as the first gate signal 112_(N−1). In addition, since the node P at the high level may turn on the third transistor T3, a voltage at the second gate signal 112_N is at the same low level (such as VGL) as the first pulse signal CK1. Thus, during the set period t1, the gate driver circuit 210 outputs the second gate signal 112_N at the low level.

During the boost period t2, the third transistor T3 and the sixth transistor T6 are turned on, and the first transistor T1, the second transistor T2, the fourth transistor T4, the fifth transistor T5, and the seventh transistor T7 are not turned on. Specifically, during the boost period t2, since the first gate signal 112_(N−1) is at a low level, the first transistor T1 is not turned on, and the voltage at the node P is in a floating state. At this time, since the node P is still at a high level, the third transistor T3 can be turned on, and the first pulse signal CK1 is at a high level, the node P may be boosted to a voltage greater than the high level VGH by the first capacitor C1. In addition, since the node P at the high level may turn on the third transistor T3, the voltage at the second gate signal 112_N is at the same high level as the first pulse signal CK1.

During the reset period t3, the second transistor T2, the fourth transistor T4, the fifth transistor T5, and the seventh transistor T7 are turned on, and the first transistor T1, the third transistor T3, and the sixth transistor T6 are not turned on. Specifically, during the reset period t3, since the third gate signal 112_(N+1) and the second pulse signal CK2 are at a high level, the fifth transistor T5 and the seventh transistor T7 can be turned on, the thus the node X is at a high level. The node X at the high level may turn on the second transistor T2, the node P is at a low level, and the first transistor is not turned on. At the same time, the node X at the high level may also turn on the fourth transistor T4; thus, the voltage at the second gate signal 112_N is also low level. Thus, during the reset period t3, the third gate signal 112_(N+1) and the second pulse signal CK2 are utilized to return the voltage at the second gate signal 112_N to a low level.

During the hold period t4, the second transistor T2 and the fourth transistor T4 are turned on, and the first transistor T1, the third transistor T3, the fifth transistor T5, the sixth transistor T6, and the seventh transistor T7 are not turned on. Specifically, during the hold period t4, since the second capacitor C2 may maintain the node X at a high level, the voltage at the second gate signal 112_N may be ensured to be maintained at a low level and not to float.

During the stable period t5, the second transistor T2, the fourth transistor T4, and the fifth transistor T5 are turned on, and the first transistor T1, the third transistor T3, the sixth transistor T6, and the seventh transistor T7 are not turned on. Specifically, during the stable period t5, the second pulse signal CK2 is at a high level, which can turn on the fifth transistor T5. The fifth transistor T5 is utilized to re-ensure that the node X can be maintained at a high level, thus ensuring that the fourth transistor T4 is stabilized so that the voltage at the second gate signal 112_N is maintained at a low level continuously.

Figure 4:
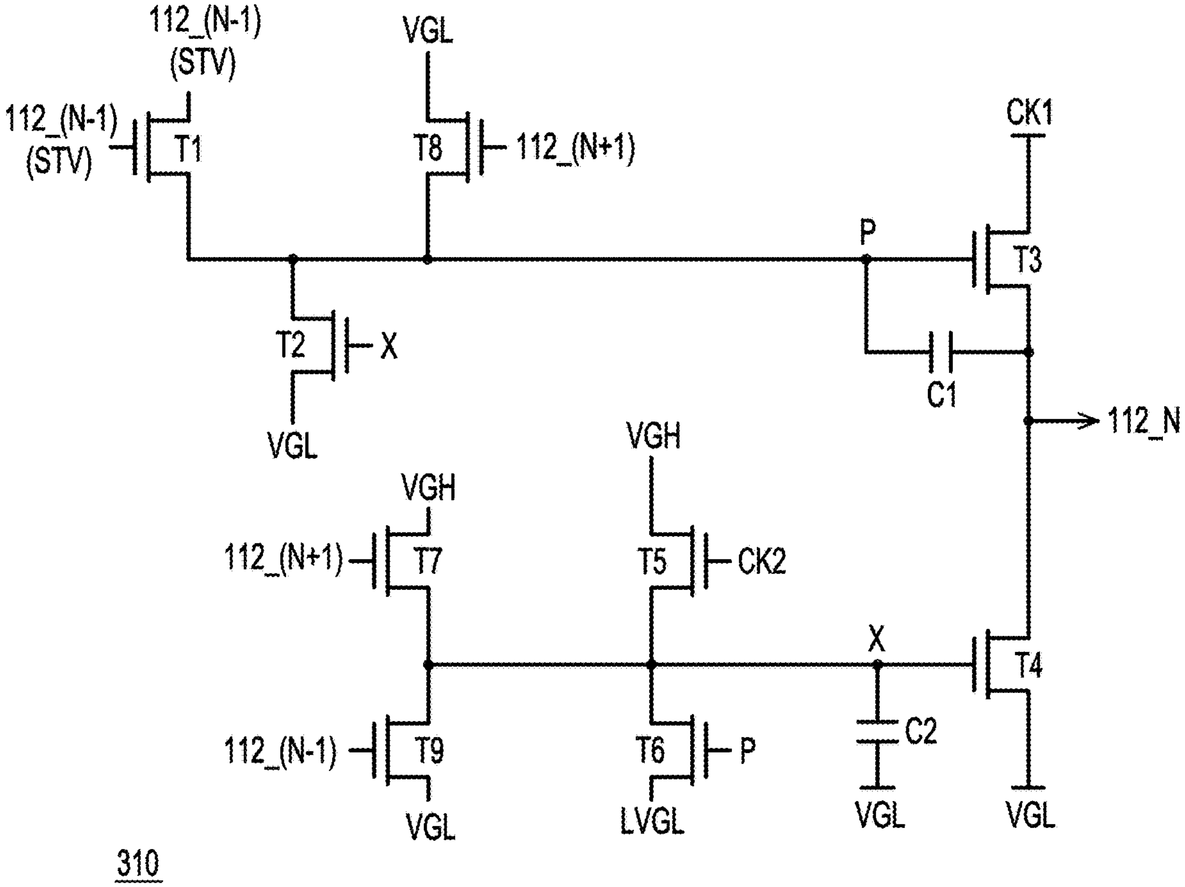
FIG. 4 is a schematic circuit structure diagram of a gate driver circuit according to another embodiment of the disclosure.

FIG. 4 is a schematic circuit structure diagram of a gate driver circuit according to another embodiment of the disclosure. Referring to FIG. 4, a gate driver circuit 310 of this embodiment is similar to the gate driver circuit 210 of the embodiment of FIG. 2, and the main difference between the two is that, for example, the gate driver circuit 310 further includes eighth transistor T8 and ninth transistor T9.

Specifically, the eighth transistor T8 has a first end, a second end, and a control end. The first end of the eighth transistor T8 is coupled to the first voltage VGL. The second end of the eighth transistor T8 is coupled to the control end P of the third transistor T3. The control end of the eighth transistor T8 is coupled to the third gate signal 112_(N+1). The ninth transistor T9 has a first end, a second end, and a control end. The first end of the ninth transistor T9 is coupled to the second end of the seventh transistor T7. The second end of the ninth transistor T9 is coupled to the first voltage VGL. The control end of the ninth transistor is coupled to the first gate signal 112_(N−1). In addition, in this embodiment, the second end of the sixth transistor T6 is coupled to a third voltage LVGL, and the third voltage LVGL is less than the first voltage VGL.

An operation mode of the gate driver circuit 310 during each drive period can be followed by the embodiments of FIG. 2 and FIG. 3.

To sum up, in the embodiment of the disclosure, the gate driver circuit may use seven or nine transistors and two capacitors to realize the function of driving the electronic paper display panel. In the embodiment using seven transistors, the number of transistors in the gate driver circuit may be reduced, reducing an area of a circuit layout. Reducing the area of the circuit layout further allows for a narrower bezel design. By using the fourth transistor, the second gate signal may be kept at a low level to maintain the stability of the voltage of the gate line. In addition, the second pulse signal is used to control the fifth transistor so that the fifth transistor does not need to use a diode connection method to avoid the consumption of short-circuit current. Moreover, the gate driver circuit is disposed on the electronic paper display panel, which is a GOA (gate on array) design, eliminating the need for a separate gate driver chip and reducing production costs.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gate driver circuit configured to drive an electronic paper display panel, the gate driver circuit comprising:

a first transistor having a first end, a second end, and a control end, wherein the first end and the control end of the first transistor are coupled to a first gate signal;

a second transistor having a first end, a second end, and a control end, wherein the first end of the second transistor is coupled to the second end of the first transistor, and the second end of the second transistor is coupled to a first voltage;

a third transistor having a first end, a second end, and a control end, wherein the first end of the third transistor is coupled to a first pulse signal, the second end of the third transistor is configured to output a second gate signal, and the control end of the third transistor is coupled to the first end of the second transistor;

a fourth transistor having a first end, a second end, and a control end, wherein the first end of the fourth transistor is coupled to the second end of the third transistor, the second end of the fourth transistor is coupled to the first voltage, and the control end of the fourth transistor is coupled to the control end of the second transistor;

a fifth transistor having a first end, s second end, and a control end, wherein the first end of the fifth transistor is coupled to a second voltage, the second end of the fifth transistor is coupled to the control end of the fourth transistor, and the control end of the fifth transistor is coupled to a second pulse signal;

a sixth transistor having a first end, a second end, and a control end, wherein the first end of the sixth transistor is coupled to the second end of the fifth transistor, and the control end of the sixth transistor is coupled to the control end of the third transistor;

a seventh transistor having a first end, a second end, and a control end, wherein the first end of the seventh transistor is coupled to the second voltage, the second end of the seventh transistor is coupled to the second end of the fifth transistor, and the control end of the seventh transistor is coupled to a third gate signal;

a first capacitor having a first end and a second end, wherein the first end of the first capacitor is coupled to the control end of the third transistor, and the second end of the first capacitor is coupled to the second end of the third transistor; and a second capacitor having a first end and a second end, wherein the first end of the second capacitor is coupled to the control end of the fourth transistor, and the second end of the second capacitor is coupled to the first voltage, wherein the first voltage is less than the second voltage.

2. The gate driver circuit according to claim 1, wherein the second end of the sixth transistor is coupled to the first voltage.

3. The gate driver circuit according to claim 1, wherein the electronic paper display panel comprises a $(N-1)^{th}$ gate line, a $N^{th}$ gate line, and a $(N+1)^{th}$ gate line, the first gate signal is configured to drive the $(N-1)^{th}$ gate line, the second gate signal is configured to drive the $N^{th}$ gate line, and the third gate signal is configured to drive the $(N+1)^{th}$ gate line, wherein N is a natural number greater than 2.

4. The gate driver circuit according to claim 1 further comprising:

an eighth transistor having a first end, a second end, and a control end, wherein the first end of the eighth transistor is coupled to the first voltage, the second end of the eighth transistor is coupled to the control end of the third transistor, and the control end of the eighth transistor is coupled to the third gate signal; and a ninth transistor having a first end, a second end, and a control end, wherein the first end of the ninth transistor is coupled to the second end of the seventh transistor, the second end of the ninth transistor is coupled to the first voltage, and the control end of the ninth transistor is coupled to the first gate signal.

5. The gate driver circuit according to claim 4, wherein the second end of the sixth transistor is coupled to a third voltage, and the third voltage is less than the first voltage.

6. The gate driver circuit according to claim 1, wherein during a set period, the first transistor, the third transistor, and the sixth transistor are turned on, and the second transistor, the fourth transistor, the fifth transistor, and the seventh transistor are not turned on.

7. The gate driver circuit according to claim 1, wherein during a boost period, the third transistor and the sixth transistor are turned on, and the first transistor, the second transistor, the fourth transistor, the fifth transistor, and the seventh transistor are not turned on.

8. The gate driver circuit according to claim 1, wherein during a reset period, the second transistor, the fourth transistor, the fifth transistor, and the seventh transistor are turned on, and the first transistor, the third transistor, and the sixth transistor are not turned on.

9. The gate driver circuit according to claim 1, wherein during a hold period, the second transistor and the fourth transistor are turned on, and the first transistor, the third transistor, the fifth transistor, the sixth transistor, and the seventh transistor are not turned on.

10. The gate driver circuit according to claim 1, wherein during a stable period, the second transistor, the fourth transistor, and the fifth transistor are turned on, and the first transistor, the third transistor, the sixth transistor, and the seventh transistor are not turned on.

11. The gate driver circuit according to claim 1, wherein the gate driver circuit is disposed on the electronic paper display panel.

* * * * *